US008811197B2

(12) United States Patent
Chen

(10) Patent No.: US 8,811,197 B2
(45) Date of Patent: Aug. 19, 2014

(54) FORWARDING DATA UNIT ASSOCIATED WITH LIMIT VALUE

(75) Inventor: Jun Chen, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 677 days.

(21) Appl. No.: 12/137,254

(22) Filed: Jun. 11, 2008

(65) Prior Publication Data

US 2009/0310606 A1  Dec. 17, 2009

(51) Int. Cl.
*H04L 12/28* (2006.01)
*H04J 1/16* (2006.01)

(52) U.S. Cl.
USPC ............................ 370/252; 370/238; 370/389

(58) Field of Classification Search
USPC .......................................... 370/252, 238, 389
See application file for complete search history.

(56) References Cited

U.S. PATENT DOCUMENTS

| | | | |
|---|---|---|---|
| 6,501,756 B1 | 12/2002 | Tanaka | |
| 6,687,247 B1* | 2/2004 | Wilford et al. | 370/392 |
| 2003/0147345 A1* | 8/2003 | Takagi et al. | 370/222 |
| 2005/0058129 A1* | 3/2005 | Jones et al. | 370/389 |
| 2005/0076114 A1* | 4/2005 | Cook | 709/224 |
| 2006/0193257 A1* | 8/2006 | Behzadi | 370/230 |
| 2007/0025241 A1* | 2/2007 | Nadeau et al. | 370/229 |
| 2008/0062916 A1* | 3/2008 | Mosko et al. | 370/328 |
| 2008/0175162 A1* | 7/2008 | Wing et al. | 370/252 |
| 2010/0157834 A1* | 6/2010 | Keromytis et al. | 370/252 |

OTHER PUBLICATIONS

'Juniper Networks Field Guide and Reference' [online], Juniper Networks® Field Guide and Reference, [published on Oct. 11, 2002]. Retrieved from the internet: http://proquest.safaribooksonline.com/print?xmlid=0321122445/ch1.
Sherwood, Rob and Spring, Neil, "Touring the Internet in a TCP Sidecar" *Proceedings of the 6th ACM SIGCOMM Conference on Internet Measurement*, Oct. 25-27, 2006, pp. 339-334.
'Internet Protocol Suite' [online], Wikipedia, [published on Jan. 8, 2007], [retrieved on May 20, 2009]. Retrieved from the internet: http://web.archive.org/web/20070108234332/en.wikipedia.org/wiki/Internet_prtocol_suite.
'Traceroute' [online], Wikipedia, [published on Sep. 14, 2006], [retrieved on May 20, 2009]. Retrieved from the internet: http://web.archive.org/web/20060914025555/http://en.wikipedia.org/vviki/traceroute.
'UDP-Based Data Transfer Protocol' [online], National Center for Data Mining Category: Internet Protocols, [published on Sep. 13, 2006], [retrieved on May 20, 2009]. Retrieved from the internet: http://web.archive.org/web/20060913000000/http://en.wikipedia.org/wiki/UDP-based_Dat.
'Internet Control Message Protocol' [online], Wikipedia, [published on Sep. 15, 2006], [retrieved on May 20, 2009]. Retrieved from the internet: http://web.archive.org/web/20060915122509/http://en.wikipedia.org/wiki/internet_control.

(Continued)

*Primary Examiner* — John Pezzlo
(74) *Attorney, Agent, or Firm* — Fish & Richardson P.C.

(57) ABSTRACT

Among other disclosed subject matter, a computer-implemented method for forwarding data includes receiving a data unit that is on a route toward a destination. The data unit is associated with a first limit value regarding forwarding of the data unit. The method includes causing the data unit to be associated with a second limit value at least equal to the first limit value. The method includes forwarding the data unit to a next recipient in the route, the data unit associated with the second limit value.

13 Claims, 5 Drawing Sheets

(56) References Cited

OTHER PUBLICATIONS

'Time to Live' [online], Web Archive, [published on Sep. 13, 2006], [retrieved on May 20, 2009]. Retrieved from the internet: http://web.archive.org/web/20060913000000/http://en.wikipedia.org/wiki/Time_to_live.

Notification of Transmittal of the Internal Search Report and the Written Opinion of the International Searching Authority, or the Declaration, dated Sep. 14, 2009, European patent Office, for PCT/US2009/045961, 14 pages.

International Preliminary Report on Patentability for Application No. PCT/US2009/045961, dated Dec. 23, 2010, 7 pages.

* cited by examiner

FORWARDING DATA UNIT ASSOCIATED WITH LIMIT VALUE

TECHNICAL FIELD

This document relates to information processing.

BACKGROUND

Some computers in today's networks operate using one or more limit values. A limit value can define, for a particular packet, how long that packet is to be allowed to exist in the network. When the limit value has expired, for example because it has been successively decremented as the packet is forwarded, the packet can be discarded. This can seek to avoid the likelihood that a packet remains indefinitely in the network.

As a particular example, Internet Control Message Protocol (ICMP) requires an internet protocol (IP) router to drop an IP packet if its Time-To-Live (TTL) value is 0, and to send back an ICMP Time Exceeded error message to the sender of the packet. A so-called traceroute program (e.g., traceroute in UNIX/Linux, tracert in Windows) can be implemented and can use the ICMP feature to attempt to learn the path from source to destination.

SUMMARY

The invention relates to a limit value.

In a first aspect, a computer-implemented method for forwarding data includes receiving a data unit that is on a route toward a destination. The data unit is associated with a first limit value regarding forwarding of the data unit. The method includes causing the data unit to be associated with a second limit value at least equal to the first limit value. The method includes forwarding the data unit to a next recipient in the route, the data unit associated with the second limit value.

Implementations can include any, all or none of the following features. The first limit value can be a first time-to-live value for the data unit and the second limit value can be a second time-to-live value for the data unit. The method can further include determining the first time-to-live value upon receipt of the data unit, wherein the data unit is associated with the second limit value based on determining that the first time-to-live value equals one; wherein for another data unit whose time-to-live value is determined to not equal one, the time-to-live value is instead reduced before forwarding the other data unit. A computer network can include a component that comprises a plurality of recipients in the route, and the associating can cause the component to appear as a single hop in the route in a traceroute analysis. A reducing component can be configured to reduce limit values for received data units, and associating the data unit with the second limit value can include circumventing a limit value reduction by the reducing component. Circumventing the limit value reduction can include intercepting the data unit after receipt and before the limit value reduction; associating the data unit with a third limit value greater than the first limit value; and causing the reducing component to receive the data unit associated with the third limit value, wherein the limit value reduction reduces the third limit value to the second limit value. The second limit value can be greater than the first limit value. The method can further include identifying, before the association of the second limit value, a number of hops in the route to be masked; wherein the association of the data unit with the second limit value is based on the identified number.

In a second aspect, a system includes a first device to associate a data unit with a first limit value regarding forwarding of the data unit, and forward the data unit in a route toward a destination. The system includes a second device to receive the data unit from the first component and associate the data unit with a second limit value at least equal to the first limit value.

Implementations can include any, all or none of the following features. The system can include a plurality of second devices, and the associating can cause the plurality of second devices to appear as a single hop in the route in a traceroute analysis. The second component can include a limit value reducer configured to perform limit value reduction on each data unit received by the system; and a limit value increaser configured to associate the data unit with a third limit value before the limit value reduction by the limit value reducer, the third limit value greater than the first limit value, wherein the limit value reducer reduces the third limit value to the second limit value.

In a third aspect, a router includes a receiver to receive a data unit that is on a route toward a destination, the data unit associated with a first limit value regarding forwarding of the data unit. The router includes means for causing the data unit to be associated with a second limit value at least equal to the first limit value.

Implementations can include any, all or none of the following features. The means for causing the data unit to be associated can include means for intercepting the data unit after receipt and before the association with the second limit value; means for associating the data unit after interception with a third limit value greater than the first limit value; and means for reducing the third limit value to the second limit value. The first limit value can be a first time-to-live value for the data unit, the second limit value can be a second time-to-live value for the data unit, and the third limit value can be a third time-to-live value for the data unit.

In a fourth aspect, a router includes a receiver to receive a data unit that is on a route toward a destination, the data unit associated with a first limit value regarding forwarding of the data unit. The router includes a limit value component to cause the data unit to be associated with a second limit value at least equal to the first limit value.

Implementations can provide any, all or none of the following advantages. Preventing outsiders from figuring out a network topology by masking or otherwise hiding one or more routers from a traceroute process, such as for security reasons. Providing that network equipment that contains multiple IP switching chips can appear as one hop for a traceroute program, instead of multiple hops. Providing selective masking of a hop in a route toward a destination.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
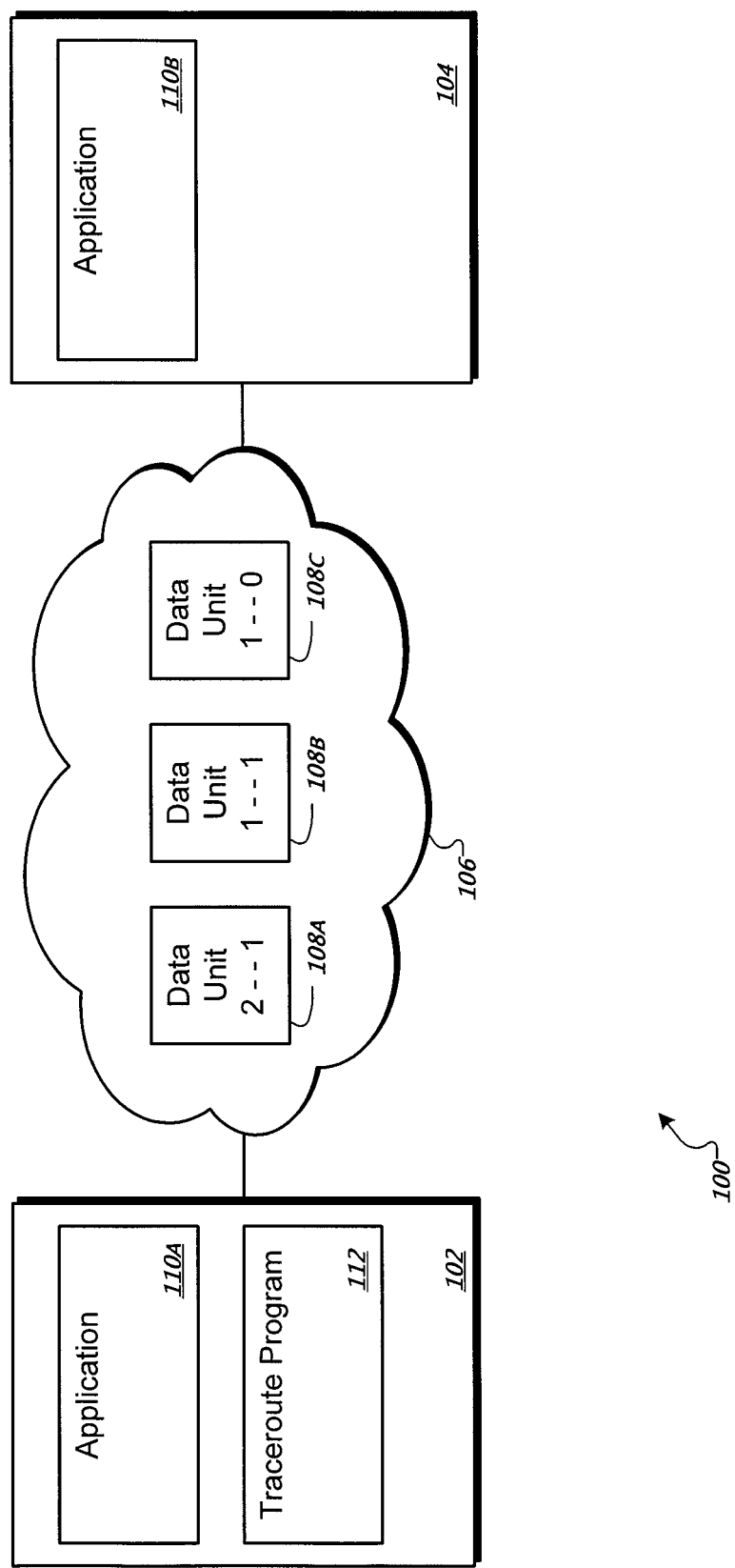
FIG. 1 shows an example of a system in which data can be forwarded.

FIG. 1 shows an example of a system 100 in which data can be forwarded. For example, a first device 102 can forward a data unit such as a packet of information to a second device 104 over a network 106. In some implementations, the network 106 can include the internet and the devices 104, 106 can include client and/or server devices connected thereto. For example, a user of the device 102 can send a message to, and/or request information from, the device 104. Below will be described examples how a limit value regarding forwarded information can be selectively set to accomplish one or more desired results, such as to hide one or more devices from a traceroute process. Other architectures can be used, including some not using a client-server configuration.

Here, a data unit is forwarded from the device 102 through the network 106 for receipt by the device 104. During the routing, the data unit (e.g., one or more packets) can be handled and forwarded by one or more devices that are part of the network 106. For clarity, the data unit is shown in each of three exemplary intermediary devices. That is, the packet on the way from the device 102 to the device 104 is schematically shown as data units 108A-C. In this example, the substantive content of the data unit is assumed not to change along the route. That is, each of the data units 108A-C here contains the same substantive content (e.g., the entire or partial message sent from the device 102). In some implementations, the data unit does not contain substantive content relating to the message, but rather is sent by the device 102 to determine the path that the message might take in traveling to the device 104.

In this implementation, the devices 102 and 104 contain application programs 110 that can for example be used in connection with information exchanged over the network 106. In some implementations, the programs 110A-B can be browsers, server applications, or any other type of applications. For example, the application 110A (e.g., a browser) can be used to request content from the application 110B (e.g., a server application) to be delivered over the network 106, or vice versa.

In some implementations, the device 102 can follow an established procedure for sending packets or other types of data units to recipients through the network 106. For example, using a network address of the intended recipient (the device 104), the device 102 can look up a first intermediary recipient and send the data unit 108A to it, for further transmission through the route toward the device 104. For example, that first intermediary recipient can be considered a first hop in the route toward the final destination. From the first hop, the data unit 108B can be forwarded to a second hop (e.g., the second intermediary recipient), and so on.

In this implementation, the device 102 provides the data unit 108A with a limit value before sending it to the first hop. For example, the limit value can be a time-to-live (TTL) value, such as the TTL referred to in Internet Protocol (IP). IP states that TTL is to be decreased at each hop along the route, until the TTL equals zero. The device that sees the TTL=1 should, according to IP, decrement TTL to 0, drop the packet and send an error message for receipt by the sender (e.g., for receipt by the device 102).

Either or both of the devices 102, 104 can include a traceroute program 112. In some implementations, the traceroute program can detect and identify one or more hops traversed by a data unit (e.g., a packet) on the route between the devices. For example, the traceroute program 112 can send packets with successively higher TTL values, with the intention that that the respective packets will be dropped by hops further and further away from the device 102, thus gradually mapping out the route between the devices. The traceroute program can thereby generate a list of the hops thus identified, for example for output to a user who is interested in the route.

In some implementations, a router decrements TTL if it is>=1. When TTL is decremented to 0, the packet is dropped. In the following example, in short, the device 102 sets TTL=2; at 108A the TTL is decremented (2−1); at 108B the TTL is not decremented (1−1); and at 108C the TTL is decremented (1−0).

Here, the device 102 sets TTL=2 for the data unit 108A. This information can be embedded in the data unit or associated therewith in any suitable way. At the first hop, the TTL is decremented by one before the data unit is passed on toward the next recipient, and the data unit 108A then has the TTL=1, as indicated by the noted change "2−1". That is, the time-to-live for the data unit 108A has been lowered by one unit (such as by an integer value or by a decreased time value) as the data unit passes through the first hop.

Thus, the data unit 108B arrives at the second hop of the route bearing a TTL=1. When the data unit is forwarded out from the second hop, however, the TTL has the value (here: TTL=1) as it did upon arriving at the second hop. This is here indicated by the notation "1−1". In some implementations, the TTL does not change while at the second hop. For example, the second hop may be configured to ignore the IP instruction to decrement the TTL upon passing along the packet, or to suppress a component configured to perform such decrementation. As another example, the TTL may be first incremented at the second hop and then decremented, leaving the resulting TTL equal to, or higher, than the TTL that the data unit 108B had upon arrival. Other approaches can be used.

As a result, when the data unit 108C arrives at the third hop, it has TTL=1 in this example. In contrast to the second hop and similar to the first hop, the TTL may here be decremented. That is, the data unit 108C will be decremented from the TTL=1 to the TTL=0, as indicated by the noted change "1−0". According to IP, moreover, the device processing the data unit 108C may be instructed to drop the data unit due to the TTL having the value zero and send an error message (e.g., a Time Exceeded error message as described in IP) to the device 102. As noted earlier, the data units 108A-C may have been sent to track the route traversed between the devices 102 and 104 and the eventual dropping of the packet may not pose any data loss or other adverse consequences for either of the devices.

The error message, when received by the device 102, announces to that device who in the route that handled the data unit 108C. Thus, the device 102 now knows the identity of that device.

The device 102 may also have learned the identity of one or more other devices in the route. Assume, for example, that the device 102 sends a data unit to the first hop with TTL=1. The first hop may decrement that TTL to zero, and thereafter drop the data unit and send an error message in response. Thus, the device 102 may have learned the identity also of the first hop.

Note, however, that the device 102 does not learn the identity of the second hop in the example described here. This is because the TTL of the data unit 108B when leaving the second hop is at least the same as it was upon arrival. Thus, the second hop does not see a data unit with TTL=0 in this example, and therefore does not send any error message to the device 102. The net result may be that the second hop is invisible to the traceroute program 112, which fact may indicate to the traceroute program that the data unit traveled directly from the first hop (where TTL=1 was set) to the third hop (where the data unit with TTL=1 was received). Thus, the second hop can here be considered masked from the traceroute program 112.

Figure 2:
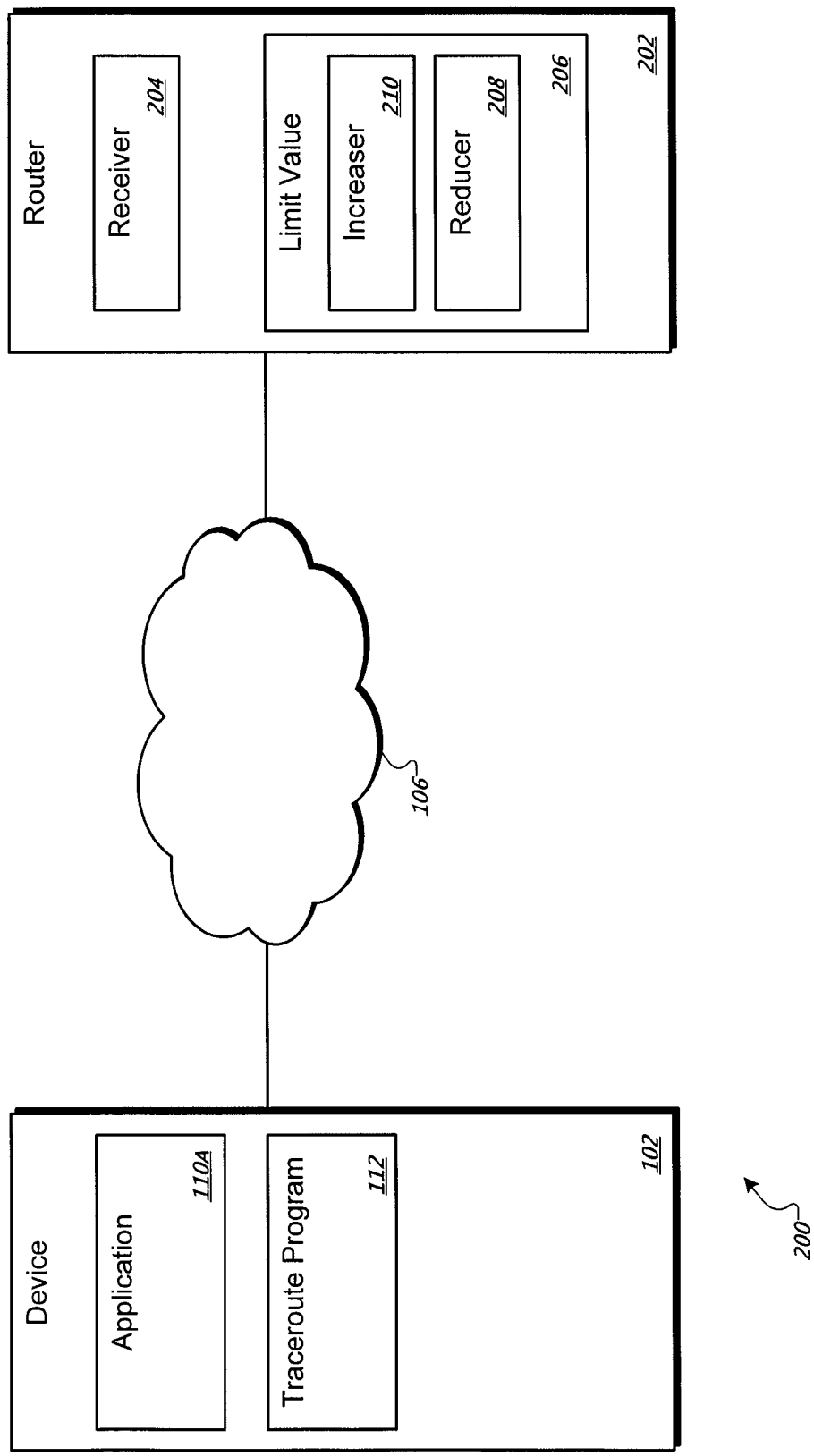
FIG. 2 shows an example of a system.

FIG. 2 shows an example of a system 200. The system 200 can include one or more devices, such as the first device 102 described above, and a router 202. The device 102 and the router can be connected to the network 106. For example, the router 202 can be the second hop in the route between the device 102 and the device 104. Other architectures can be used in some implementations.

The router here includes a receiver 204. The receiver 204 can be configured to receive a data unit (such as a packet) that is on a route toward a destination. In some implementations, the receiver 204 is the part of the router 202 that connects with one or more other devices (such as another router and/or the device(s) 102 or 104). For example, the receiver 204 can receive the data unit 108B forwarded from the first hop. The data unit can have a first limit value (e.g., TTL=2) when received.

The router here includes a limit value component 206 that manages one or more limit values of a data unit received by the receiver 204. The limit value component 206 can associate the data unit with a second limit value (e.g., TTL=2) that is at least equal to the first limit value (e.g., at least equal to TTL=2) instead of the first limit value. The limit value component 206 can be implemented using software or hardware, or combinations thereof, to name just a few examples.

The limit value component 206 herein includes a reducer 208 that is configured to reduce the limit value. In some implementations, the reducer 208 decrements the limit value by an integer amount. The reducer can lower a TTL=3 to a TTL=2, or a TTL=2 to a TTL=1, to name two examples. For example, the reducer can be included in a chip or other component as a standard feature in accordance with IP, such as in existing products compatible with that standard. As such, in some implementations the reducer 208 can be considered a standard IP component that is configured to operate in accordance with IP instructions; particularly, to decrement a TTL value for received packets.

The limit value component 206 herein includes an increaser 210 that is configured to increase the limit value. In some implementations, the increaser 210 increments the limit value by an integer amount. The reducer can raise a TTL=2 to a TTL=3, or a TTL=3 to a TTL=4, to name two examples. In some implementations, the increaser 210 is configured to intercept the data unit before it is received by the reducer 208. For example, in a standard chip that includes the reducer 208, the passage of information to the reducer can be controlled so that any data unit bearing a limit value can first be processed by the increaser 210.

The result of using both the increaser 210 and the reducer 208 can be that the limit value is first increased by one and thereafter decreased by one, for a net change of zero. As another example, the net result can be an increase in the limit value. As noted earlier, the changing of a limit value can cause a hop to be masked in the route of a data unit. That is, the masking can be seen as a way of circumventing the analysis done by the traceroute program 112.

While the presently described implementation uses both the reducer 208 and the increaser 210, other implementations can operate according to other approaches. For example, the limit value component 206 can be configured to selectively decrease limit values in some circumstances (e.g., when the decrease does not cause the router 202 to be noticed as a hop in the route, such as for TTL=2 and higher) and selectively not decrease the limit value in other circumstances (e.g., when a decrease would cause the router 202 to be noticed as a hop in the route, such as for TTL=1).

That is, hops can be masked only for certain limit values. For example, any given hop may manipulate those limit values that are close to expiring (e.g, that have TTL=1) so that they are not ultimately decreased, but allow all other limit values (e.g., TTL=2 or TTL=5) to be decremented according to IP. This can be accomplished by reading the limit value of an incoming data unit and applying increase as necessary.

There will now be described examples relating to limit values. Table 1 below shows an exemplary output of a traceroute program applied from an arbitrary computer device toward an ultimate recipient which here is the web resource google.com:

TABLE 1

~:traceroute google.com
traceroute: Warning: google.com has multiple addresses; using 64.233.187.99
traceroute to google.com (64.233.187.99), 30 hops max, 40 byte packets

| | | | | | |
|---|---|---|---|---|---|
| 1 | b50dist2-v102 | (172.18.119.253) | 0.448 ms | 0.247 ms | 0.241 ms |
| 2 | 172.25.252.98 | (172.25.252.98) | 0.545 ms | 0.278 ms | 0.261 ms |
| 3 | mtvbb1-t2-2 | (172.25.254.66) | 0.336 ms | 0.292 ms | 0.282 ms |
| 4 | ipbr2-g0-2-0 | (172.25.31.63) | 0.429 ms | 0.516 ms | 0.508 ms |
| 5 | er01-nuq01-ge-1-2-0 | (172.25.252.112) | 0.720 ms | | |
| | er01-sjc02-ge-0-3-0 | (172.25.252.110) | 1.434 ms | 1.298 ms | |
| 6 | bb02-ae0.nuq01.net.google.com | (72.14.232.121) | 0.786 ms | | |
| | bb01-ae1.sjc02.net.google.com | (72.14.232.133) | 1.313 ms | 1.341 ms | |
| 7 | bb02-so-3-3-0.at101.net.google.com | (72.14.239.15) | 59.622 ms | | |
| | bb02-ge-3-0-0.nuq01.net.google.com | (72.14.236.11) | 1.568 ms | 1.506 ms | |
| 8 | dr02-ge-1-1-0.at103.net.google.com | (72.14.236.19) | 60.047 ms | 60.071 ms | |
| | dr02-ge-0-1-0.at103.net.google.com | (72.14.236.175) | 58.296 ms | | |
| 9 | dr01-ge-1-1-0.at103.net.google.com | (72.14.239.23) | 58.731 ms | | |
| | dr02-ge-1-1-0.at103.net.google.com | (72.14.236.19) | 60.583 ms | | |
| | dr01-ge-1-1-0.at103.net.google.com | (72.14.239.23) | 61.120 ms | | |
| 10 | jc-in-f99.google.com | (64.233.187.99) | 62.426 ms | 59.777 ms | |
| | cr01-ten-12-1.jc.net.google.com | (216.239.49.222) | 64.855 ms | | |

In short, Table 1 shows that ten hops are detected (labeled 1 through 10 in the output), each corresponding to one or more physical routers or other devices. Moreover, for each hop, the response times for three separate packets are given (in milliseconds); for example, 0.448 ms, 0.247 ms and 0.241 ms for the first hop and 62.426 ms, 59.777 ms and 64.855 ms for the tenth hop. Moreover, IP addresses and other information relating to individual hops is listed. As is common to traceroute procedures, the information in Table 1 can allow a sender of packets to see not only intermediary devices (e.g., routers) between the sender and the ultimate destination, but also in some situations the internal network topology or other device architecture of the destination (e.g., note that devices beginning at hop 6 in Table 1 appear to be under the control of the ultimate destination in this example.

By using techniques described herein, however, one or more of the hops can be made not to appear in the output of the traceroute process, although the non-appearing devices do participate in the routing nevertheless. Table 2 below is an example of the corresponding traceroute output:

TABLE 2

```
~:traceroute google.com
traceroute: Warning: google.com has multiple addresses; using
64.233.187.99
traceroute to google.com (64.233.187.99), 30 hops max, 40 byte packets
 1  b50dist2-v102              (172.18.119.253)   0.448 ms    0.247 ms    0.241 ms
 2  172.25.252.98              (172.25.252.98)    0.545 ms    0.278 ms    0.261 ms
 3  mtvbb1-t2-2                (172.25.254.66     0.336 ms    0.292 ms    0.282 ms
 4  ipbr2-g0-2-0               (172.25.31.63)     0.429 ms    0.516 ms    0.508 ms
 5  er01-nuq01-ge-1-2-0        (172.25.252.112)   0.720 ms
    er01-sjc02-ge-0-3-0        (172.25.252.110)   1.434 ms    1.298 ms
 6  bb02-ae0.nuq01.net.google.com (72.14.232.121) 0.786 ms
    bb01-ae1.sjc02.net.google.com (72.14.232.133) 1.313 ms    1.341 ms
 7  jc-in-f99.google.com       (64.233.187.99)   62.426 ms   59.777 ms
    cr01-ten-12-1.jc.net.google.com (216.239.49.222) 64.855 ms
```

By comparison, Table 2 shows that the hops that were labeled 6, 7 and 8 in Table 1 no longer appear in the traceroute output. For example, this can be because these hops selectively did not decrement a limit value for some packets received from the sender. Rather, the traceroute output in Table 2 ends with a seventh hop, which corresponds to the tenth hop in Table 1. In other implementations, more or fewer of the hops can be masked from the traceroute process.

Figure 3:
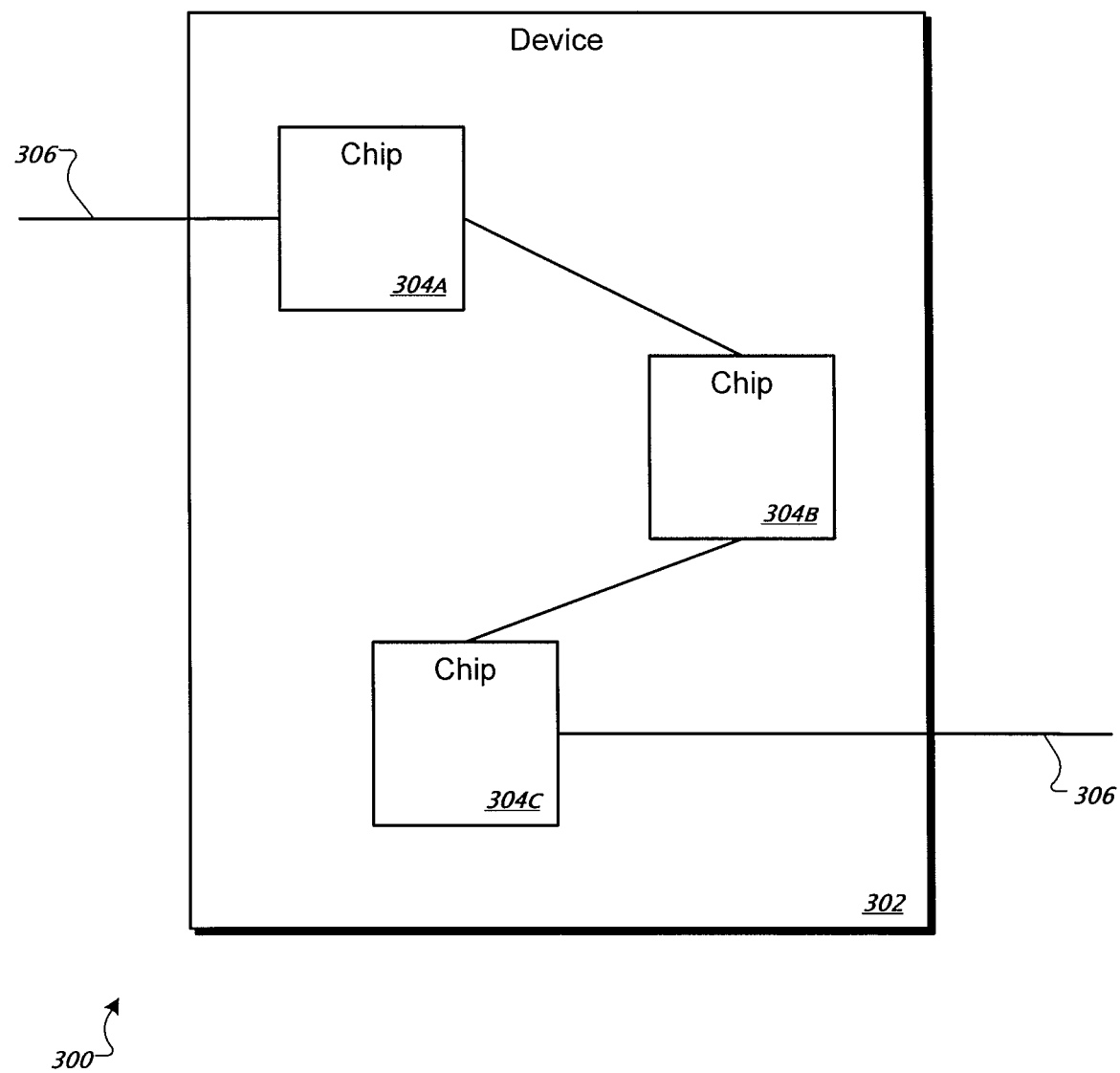
FIG. 3 shows another example of a system that can forward data.

FIG. 3 shows an example of a system that can forward data. Here, a system 300 includes a device 302, such as a router or any other kind of processor-based device. In some examples, the device 302 can be, can be included in, or can include any of the devices 102 or 104 or the intermediary devices described with reference to FIG. 1.

In this example, the device 302 includes multiple chips 304. Any kind of chips can be used, for example dedicated routing chips compatible with IP processing, such as IP switching chips. For example, an incoming packet 306 can be routed through the device 302 starting at the chip 304A, continuing with the chip 304B, and finally to the chip 304C, from which the packet 306 exits the device 302, optionally to be forwarded to another device. Accordingly, the chips 304A-C can be considered hops in the routing of the packet 306 and as such are potentially subject to being mapped by a traceroute process that tracks the advancement of packets.

However, one or more of the chips 304A-C can be selectively masked from the traceroute program using techniques described herein. For example, assume that the chip 304A omits to decrement a TLL=1 that is included in the packet 306. This can cause the limit value to instead be decreased to TTL=0 by the chip 304B, which can send a timeout message in accordance with IP. In other implementations, one or more other ones of the chips 304 can omit to decrease a limit value.

As another example, one or more of the chips 304, such as the chip 304A, can increment the limit value instead of decrementing it. This can serve to mask either only the chip 304A from the traceroute process or instead one or more other ones of the chips 304, or, as another example, all of the chips. These examples will now be elaborated.

In some implementations, the chip 304 is configured so that it decreases a TTL=1 value and thereby reveals itself to the traceroute process by sending a time-exceeded message. For other limit values, however, the chip 304A can perform selective manipulation of the limit values so as to mask the presence of the chips 304B and/or 304C from the traceroute process. For example, this can allow the device 302 to appear as a single hop in the route if only one of the chips is detected by the traceroute process. In some implementations, this can be done by increasing the limit value by a sufficient amount so that subsequent decreases by other chip(s) do not cause the chip(s) to be revealed to the traceroute program.

In some implementations, the chip 304A can mask itself from the traceroute process but permit the chips 304B and/or 304C to be revealed (e.g., due to these devices sending time-exceeded messages).

In some implementations, the chip 304A can manipulate the limit values so that none of the chips 304 are detected by the traceroute process. That is, this can let the device 302 be entirely masked from the traceroute program.

Other approaches can be used.

Figure 4A:
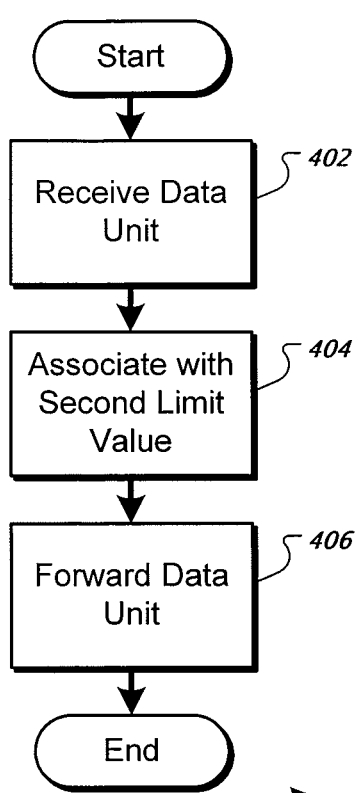
FIGS. 4A-C show examples of operations that can be performed.
Figure 4B:
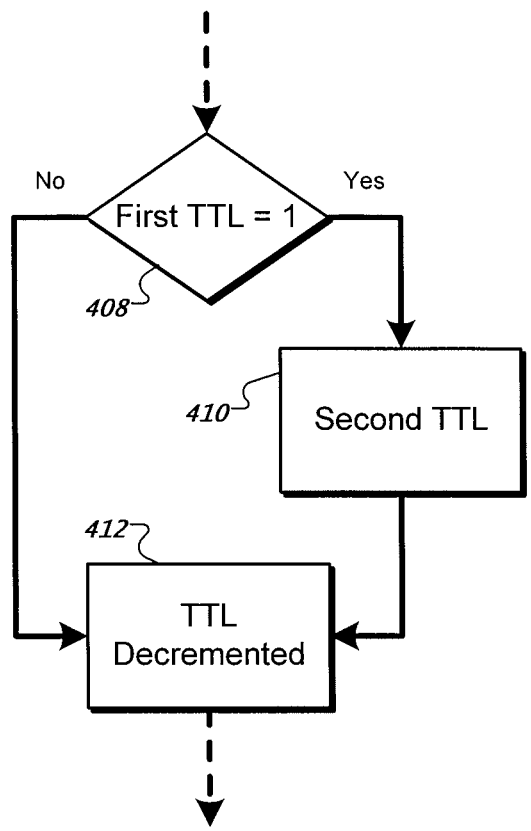
Figure 4C:
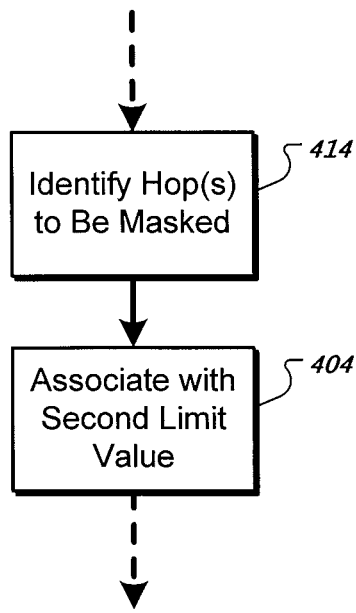

FIGS. 4A-C show examples of operations that can be performed. FIG. 4A shows a method 400. In some implementations, method 400 can be performed by a processor executing instructions stored in a computer-readable medium, such as in any of the devices 102, 104 or 302. In some implementations, more or fewer steps can be performed, and one or more steps can be performed in another order.

Step 402 involves receiving a data unit that is on a route toward a destination and associated with a first limit value regarding forwarding of the data unit. For example, the data unit 108A and/or the packet 306 can be received.

Step 404 involves causing the data unit to be associated with a second limit value at least equal to the first limit value. For example, the second hop in FIG. 1 can forward the data unit 108B having TTL=1. As another example, the increaser 210 can increase the limit value before it is subsequently decreased by the reducer 208. As another example, the chip 304A can raise the limit value to mask the presence of one or more of the chips 304B-C.

Step 406 involves forwarding the data unit to a next recipient in the route, the data unit associated with the second limit value. For example, the data unit 108B can be forwarded to the third hop in FIG. 1; the packet 306 can be forwarded to a next recipient, and/or the chip 304A can forward the packet to the chip 304B.

FIG. 4B shows an example that can be included in the method 400. Here, a decision 408 is made regarding whether a first TTL equals one. If so, step 410 is performed, in which the first TTL is replaced by a second TTL, such as by an increase. Thereafter, the TTL can be decremented in step 412.

If the first TTL does not equal one in step 408, the decrease in step 412 can be performed on the first TTL.

Thus, the steps 408-410 can for example be used in any of the hops in FIG. 1; in the device 202 and/or by the chip(s) 304.

FIG. 4C shows an example that can be included in the method 400. Here, a step 414 involves identifying one or more hop(s) to be masked from a traceroute process. For example, the chip 304A can identify that the chips 304B and 304C should be masked. This can be done in any of several ways. For example, the chip 304A can probe the subsequent chip(s) in real time for a response whether the chip(s) should be masked. As another example, the chip 304A can access a configuration record that indicates which subsequent chip(s) to mask. Other approaches can be used.

Based on this, the second limit value in the step 404 can then be chosen accordingly. For example, to mask itself and one subsequent chip, the chip 304A can cause the limit value to be increased by one; to mask two subsequent chips, by two; and so on.

Other approaches and/or combinations can be used.

Figure 5:
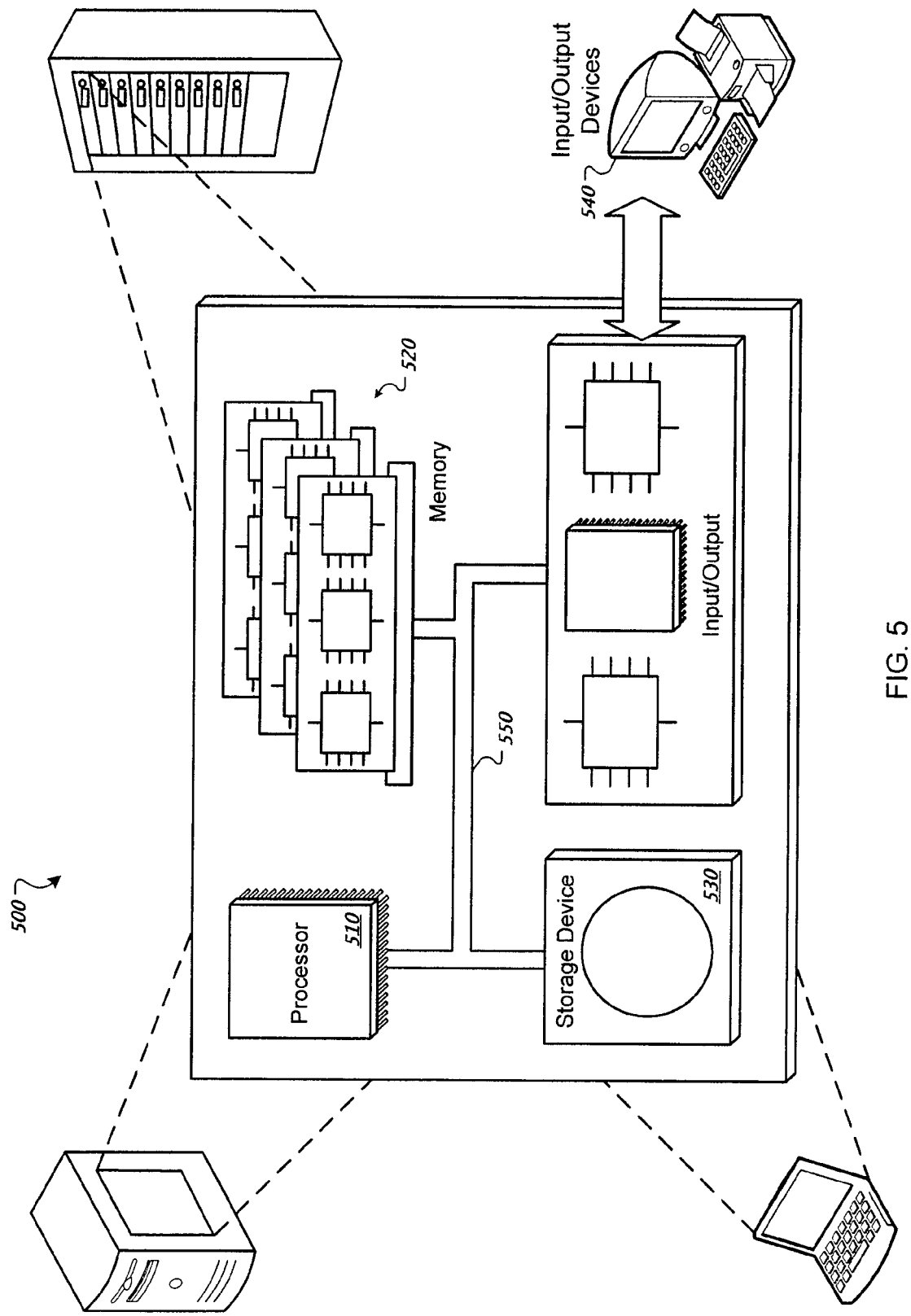
FIG. 5 is a block diagram of a computing system that can be used in connection with computer-implemented methods described in this document.

FIG. 5 is a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method for forwarding data, the method comprising:
receiving, at a first node of a network, a data unit that is on a route toward a destination, the data unit having a first time-to-live (TTL) value;
determining, in response to receiving the data unit and by accessing a configuration record that includes information about nodes in the network other than the first node, a value to add to the first TTL value;
based on determining the value to add to the first TTL value, assigning the data unit a second TTL value; and
forwarding, after assigning the second TTL value, the data unit to a next node in the route, the data unit associated with the second TTL value.

2. The computer-implemented method of claim 1, wherein the network comprises a plurality of recipients in the route, and wherein the adding causes the plurality of recipients to appear as a single hop in the route in a traceroute analysis.

3. A computer-implemented method for forwarding data, the method comprising:
receiving, at a first node of a network, a data unit that is on a route toward a destination, the data unit having a first time-to-live (TTL) value;
determining, in response to receiving the data unit and by accessing a configuration record that includes information about nodes in the network other than the first node, a value to add to the first TTL value;
associating the data unit with a second TTL value that is equal to the sum of the first TTL value and the determined value; and
wherein the network includes other nodes that are configured to reduce TTL values for received data units, and wherein the data unit is associated with the second TTL value by actions that include:
a) obtaining the data unit after the first node receives the data unit and before a TTL value reduction;
b) associating the data unit with a third TTL value that is greater than the first TTL value; and
c) causing the reducing component to receive the data unit associated with the third TTL value, wherein the TTL value reduction reduces the third TTL value to the second TTL value to cause the data unit to be associated with the second TTL value; and
forwarding, after assigning the second TTL value, the data unit to a next recipient in the route, the data unit associated with the second TTL value.

4. A computer-implemented method for forwarding data, the method comprising:
receiving, at a first node of a network, a data unit that is on a route toward a destination, the data unit having a first time-to-live (TTL) value;
determining, in the first node, the first TTL value in response to receiving the data unit and, by accessing a configuration record that includes information about nodes in the network other than the first node, assigning the data unit a second TTL value greater than or equal to the first TTL value, the assigning comprising:
a) associating the data unit with a third TTL value that is greater than the first TTL value; and
b) causing a reducing component of the network component to reduce the third TTL value to the second TTL value so that the data unit is associated with the second TTL value; and
forwarding the data unit to a next recipient in the route, the data unit associated with the second TTL value.

5. The computer-implemented method of claim 4, further comprising:
identifying, before assigning the second TTL value, a number of hops in the route to be masked;
wherein the assignment of the second TTL value to the data unit is based on the identified number.

6. A system comprising:
a first device of a network to assign a first time-to-live (TTL) value to a data unit, and forward the data unit in a route toward a destination, the first device comprising:
a first TTL value reducer configured to perform TTL value reduction on each data unit received by the system; and
a TTL value increaser configured to associate the data unit with a second TTL value before the TTL value reduction by the first TTL value reducer, the second TTL value greater than the first TTL value, wherein the second TTL value is determined by accessing a configuration record that includes information about a plurality of devices in the network other than the first device and the first TTL value reducer reduces the second TTL value to the first TTL value; and
a second device of the network to receive the data unit from the first device, the second device comprising:
a second TTL value reducer configured to perform TTL value reduction on each data unit received by the system.

7. A router comprising:
a receiver to receive a data unit that is on a route toward a destination, the data unit having a first time-to-live (TTL) value; and
means for assigning the data unit a second TTL value greater than or equal to the first TTL value, by actions that include:
1) determining the first TTL value;
2) associating the data unit with a third TTL value that is greater than the first TTL value, wherein the third TTL value is determined by adding another value to the first TTL value, the other value based on accessing a configuration record that includes information about devices in a network other than the router; and
3) reducing the third TTL value to the second TTL value to cause the data unit to be associated with the second TTL value.

8. The router of claim 7, wherein the means for assigning comprises means for intercepting the data unit after receipt, wherein the association with the second TTL value is done in response to the interception.

9. The router of claim 8, wherein the second TTL value equals the first TTL value.

10. The system of claim 7, wherein the system comprises a plurality of second nodes, and wherein the associating causes the plurality of second nodes to appear as a single hop in the route in a traceroute analysis.

11. A router comprising:
a receiver to receive a data unit that is on a route toward a destination, the data unit having a first time-to-live (TTL) value; and
a TTL value component to cause the data unit to be associated with a second TTL value greater than the first TTL value by actions that include:
1) determining the first TTL value;
2) associating the data unit with a third TTL value that is greater than the first TTL value, wherein the third TTL value is determined by adding another value to the first TTL value, the other value based on accessing a configuration record that includes information about devices in a network other than the router; and
3) reducing the third TTL value to the second TTL value to cause the data unit to be associated with the second TTL value.

12. The router of claim 11, wherein the TTL value component comprises:
   an interceptor for intercepting the data unit after receipt, wherein the association with the second TTL value is done in response to the interception; and
   a reducer for reducing the third TTL value to the second TTL value.

13. The router of claim 12, wherein the second TTL value equals the first TTL value.

* * * * *